United States Patent
Ikeda et al.

(10) Patent No.: US 10,970,585 B2
(45) Date of Patent: Apr. 6, 2021

(54) ADHERING SUBSTANCE DETECTION APPARATUS AND ADHERING SUBSTANCE DETECTION METHOD

(71) Applicant: DENSO TEN Limited, Kobe (JP)

(72) Inventors: Nobuhisa Ikeda, Kobe (JP); Nobunori Asayama, Kobe (JP); Takashi Kono, Kobe (JP); Yasushi Tani, Kobe (JP); Daisuke Yamamoto, Kobe (JP); Tomokazu Oki, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 7 days.

(21) Appl. No.: 16/561,189

(22) Filed: Sep. 5, 2019

(65) Prior Publication Data
US 2020/0210747 A1 Jul. 2, 2020

(30) Foreign Application Priority Data

Dec. 28, 2018 (JP) ............................. JP2018-247677

(51) Int. Cl.
| | | |
|---|---|---|
| *G06K 9/46* | (2006.01) | |
| *G06T 7/73* | (2017.01) | |
| *G06T 7/13* | (2017.01) | |
| *G06K 9/00* | (2006.01) | |
| *G06T 7/136* | (2017.01) | |

(52) U.S. Cl.
CPC .............. *G06K 9/4604* (2013.01); *G06T 7/13* (2017.01); *G06T 7/136* (2017.01); *G06T 7/73* (2017.01)

(58) Field of Classification Search
CPC .. G06K 9/4604; G06K 9/00791; G06T 7/136; G06T 7/73; G06T 7/13; G06T 2207/20021; G06T 2207/30168; G06T 7/0004

See application file for complete search history.

(56) References Cited

U.S. PATENT DOCUMENTS

| | | | | |
|---|---|---|---|---|
| 2015/0201120 A1* | 7/2015 | Irie | ..................... | G06K 9/00825 348/148 |
| 2015/0323785 A1* | 11/2015 | Fukata | ................. | H04N 5/2171 348/148 |
| 2018/0114089 A1* | 4/2018 | Ikeda | ........................ | B60R 1/00 |
| 2019/0228254 A1* | 7/2019 | Asayama | ........... | G06K 9/00791 |
| 2020/0210750 A1* | 7/2020 | Ikeda | .................... | G06K 9/4661 |
| 2020/0211171 A1* | 7/2020 | Ikeda | ........................ | G06T 7/13 |
| 2020/0219222 A1* | 7/2020 | Ikeda | ................. | H04N 5/22521 |
| 2020/0219280 A1* | 7/2020 | Ikeda | .................... | G06T 7/0004 |

FOREIGN PATENT DOCUMENTS

| | | |
|---|---|---|
| JP | 2012-038048 A | 2/2012 |
| JP | 2018-072312 A | 5/2018 |

* cited by examiner

*Primary Examiner* — Jon Chang
(74) *Attorney, Agent, or Firm* — Oliff PLC

(57) ABSTRACT

An adhering substance detection apparatus according to an embodiment includes a calculating unit and a determining unit. The calculating unit calculates, for each cell composed of a predetermined number of pixels in a captured image, an edge feature value that is based on edge vectors in the pixels, and that classifies an edge orientation that is included in the edge feature value, into two types of angle classes. The determining unit determines a condition of adhering substance adhering to an image capturing apparatus that captured the captured image, based on a transition count representing number of transitions the angle class goes through within a unit region that is a predetermined region composed of a predetermined number of the cells.

20 Claims, 10 Drawing Sheets

FIG.1B
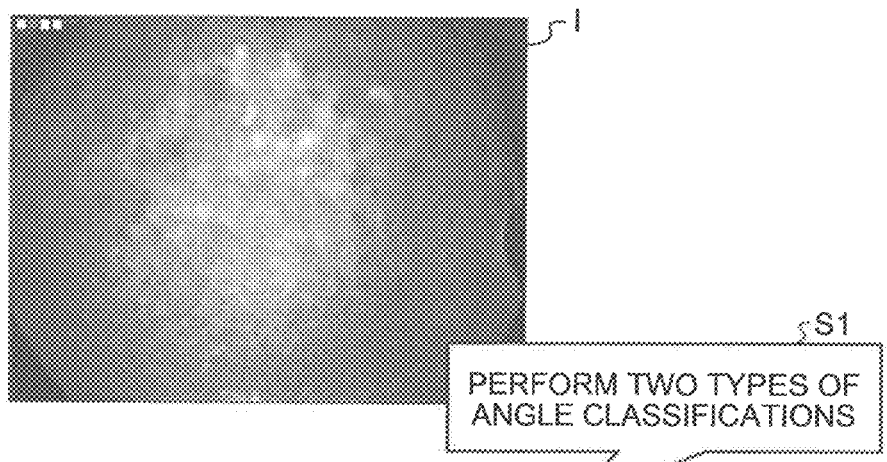
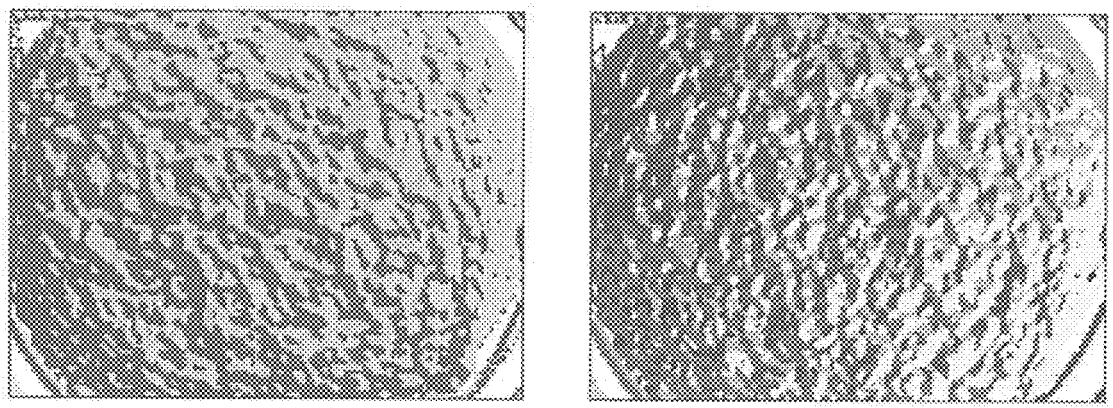
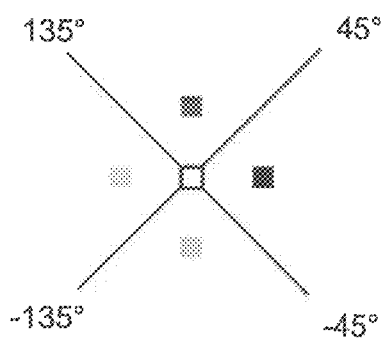
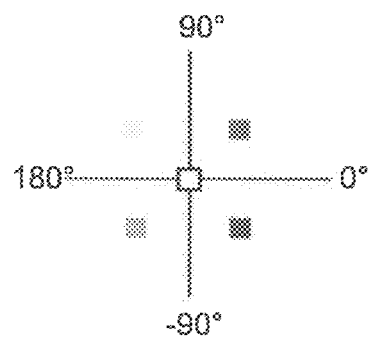

FIG.3A
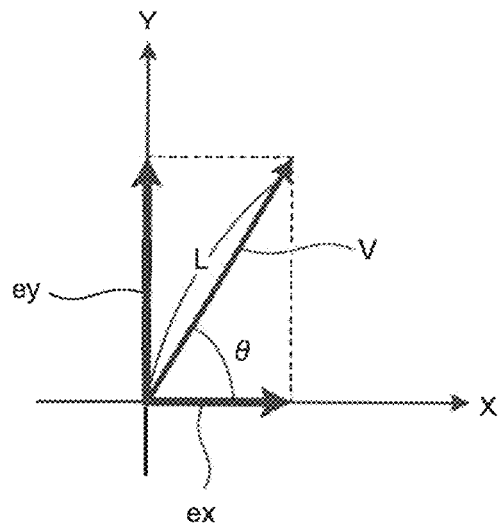
FIG.3B
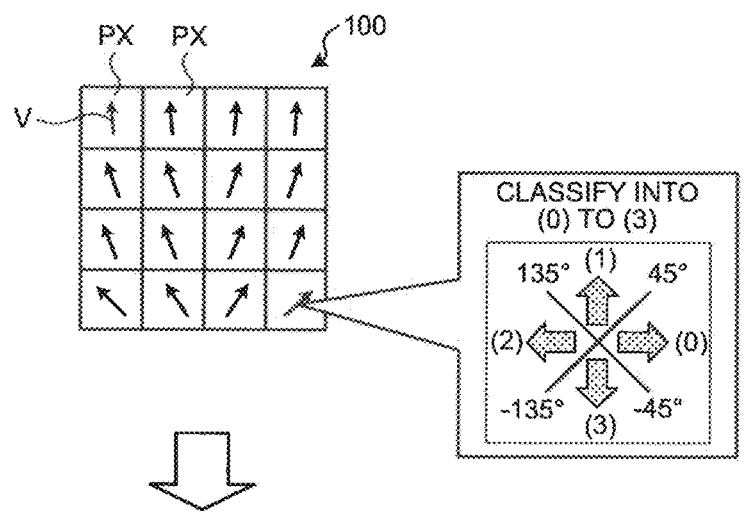
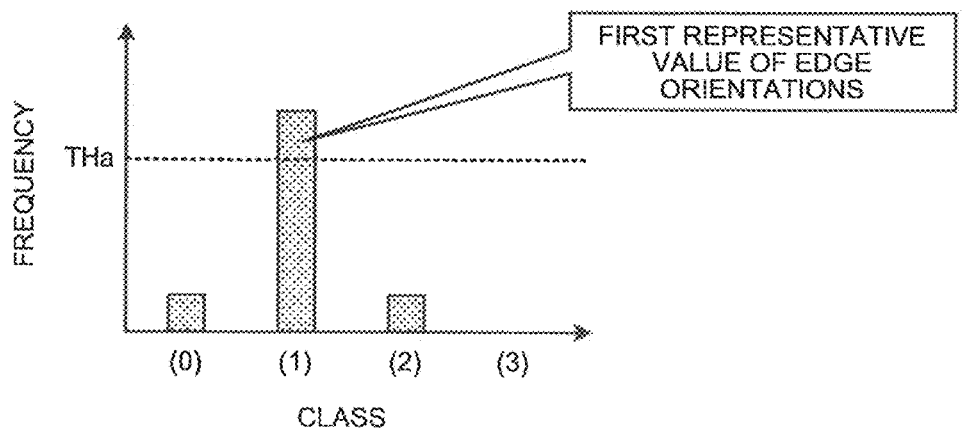

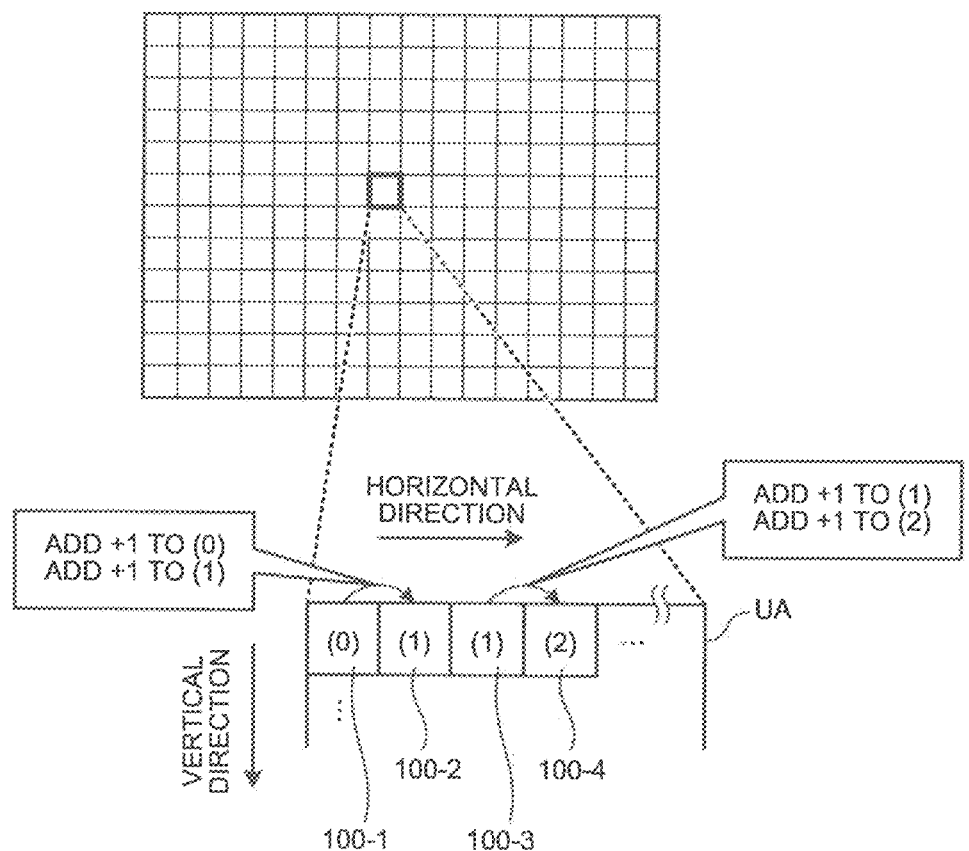

FIG.5A

| | ■CONDITIONS FOR DETERMINING GRANULAR REGION |
|---|---|
| CONDITION #1 | (0) TO (7) ALL APPEAR, AND COUNTS FALL WITHIN PREDETERMINED RANGE |
| | AND |
| CONDITION #2 | SUM OF (0) TO (3) AND SUM OF (4) TO (7) BOTH FALL WITHIN PREDETERMINED RANGE |
| | AND |
| CONDITION #3 | REGION HAS WEAK EDGE STRENGTH |

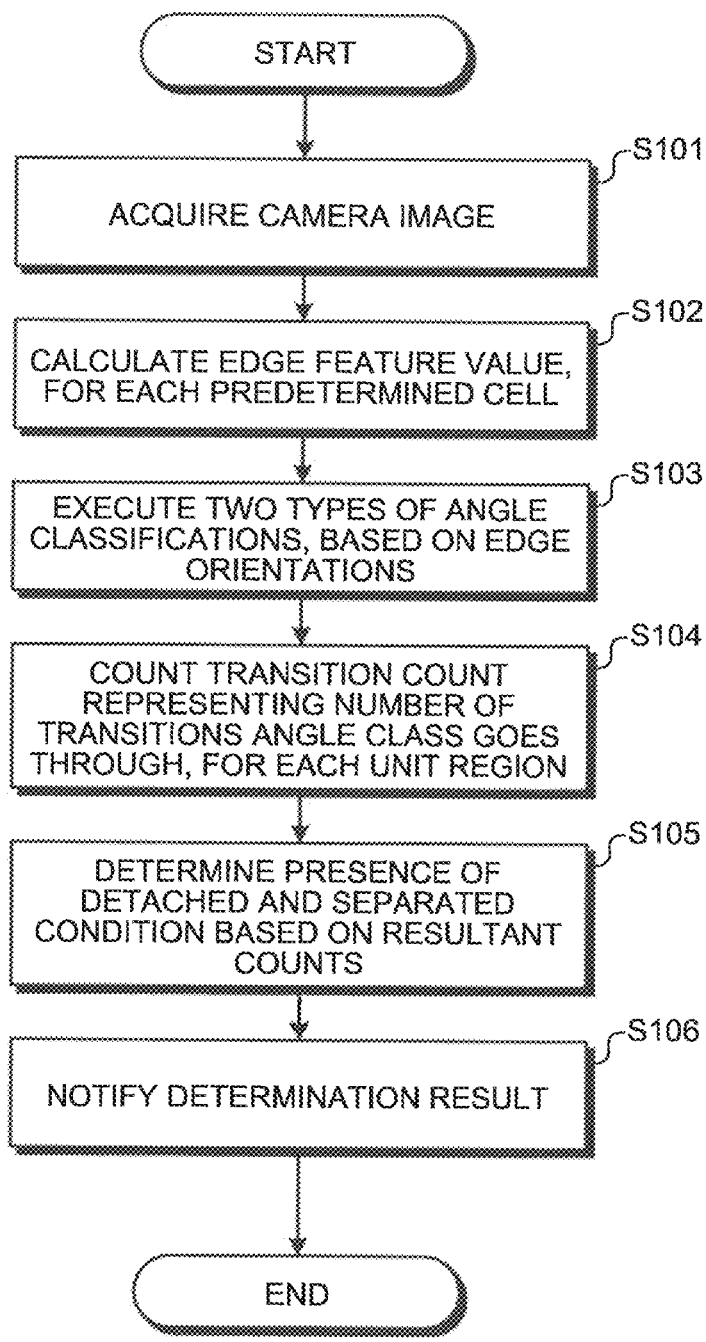

ADHERING SUBSTANCE DETECTION APPARATUS AND ADHERING SUBSTANCE DETECTION METHOD

CROSS-REFERENCE TO RELATED APPLICATION

This application is based upon and claims the benefit of priority of the prior Japanese Patent Application No. 2018-247677, filed on Dec. 28, 2018, the entire contents of which are incorporated herein by reference.

FIELD

A disclosed embodiment relate to an adhering substance detection apparatus and an adhering substance detection method.

BACKGROUND

Conventionally having been known is an adhering substance detection apparatus that detects an adhering substance adhering to a lens of a camera that is installed on a vehicle, for example, based on a captured image captured by the camera. Some adhering substance detection apparatuses detect an adhering substance based on a difference between captured images captured in the temporal order, for example (see Japanese Laid-open Patent Publication No. 2012-038048, for example).

However, in the conventional technology mentioned above, there is some room for improvement in the accuracy of adhering substance detection.

SUMMARY

An adhering substance detection apparatus according to an embodiment includes a calculating unit and a determining unit. The calculating unit calculates, for each cell composed of a predetermined number of pixels in a captured image, an edge feature value that is based on edge vectors in the pixels, and that classifies an edge orientation that is included in the edge feature value, into two types of angle classes. The determining unit determines a condition of adhering substance adhering to an image capturing apparatus that captured the captured image, based on a transition count representing number of transitions the angle class goes through within a unit region that is a predetermined region composed of a predetermined number of the cells.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings, wherein:

FIG. 1B is a second schematic for explaining the general outline of the adhering substance detection method according to the embodiment.

FIG. 3A is a first schematic illustrating details of a calculation process performed by a calculating unit.

FIG. 3B is a second schematic illustrating the details of the calculation process performed by the calculating unit.

FIG. 4A is a fourth schematic illustrating the details of the calculation process performed by the calculating unit.

FIG. 4B is a fifth schematic illustrating the details of the calculation process performed by the calculating unit.

FIG. 5A is a first schematic illustrating details of a determination process performed by a determining unit.

FIG. 6 is a flowchart illustrating the sequence of a process performed by the adhering substance detection apparatus according to the embodiment.

DESCRIPTION OF EMBODIMENT

An adhering substance detection apparatus and an adhering substance detection method according to an embodiment of the present invention will now be explained in detail with reference to the appended drawings. However, the embodiment described below is not intended to limit the scope of the present invention in any way.

Figure 1A:
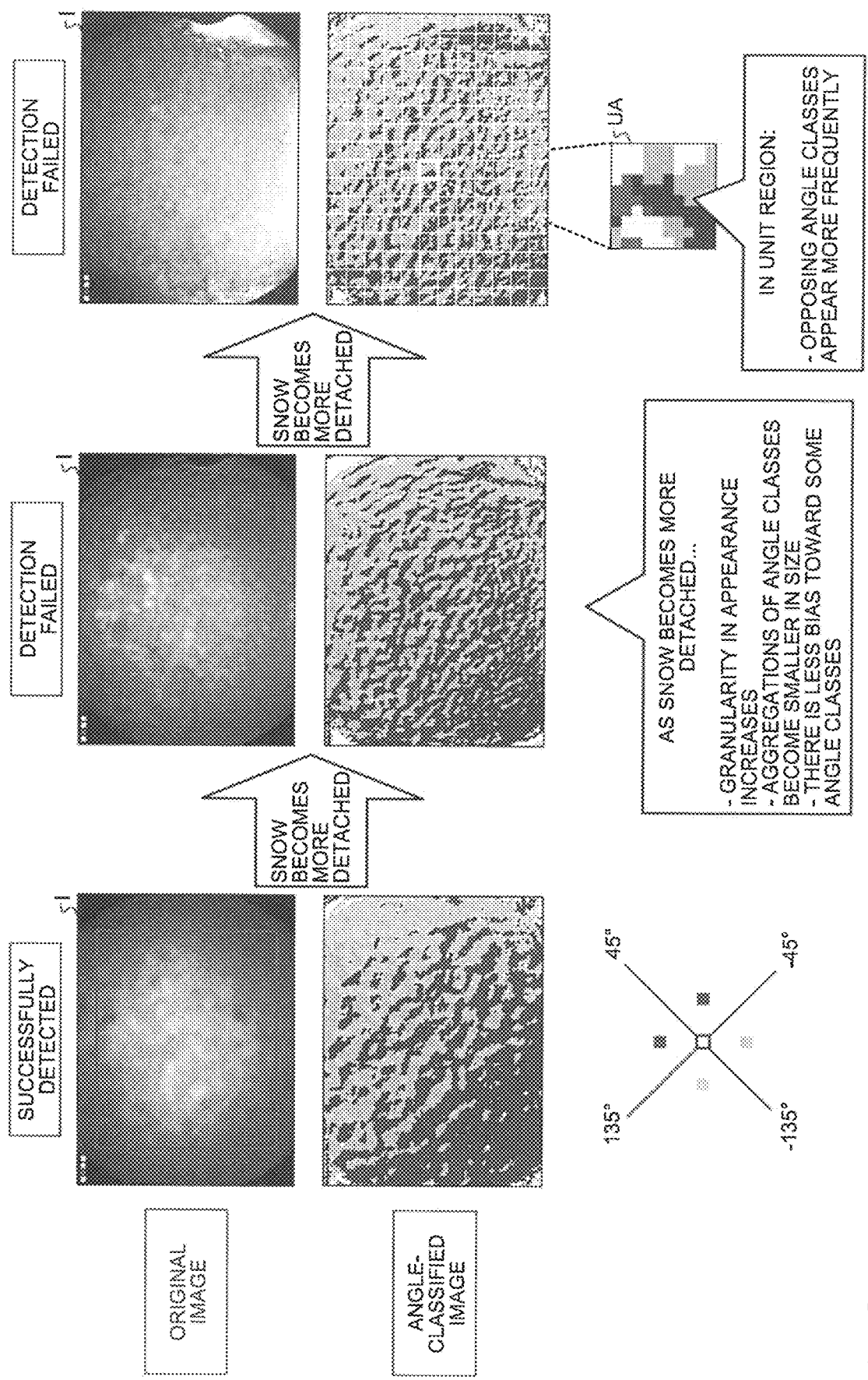
FIG. 1A is a first schematic for explaining a general outline of an adhering substance detection method according to an embodiment.
Figure 1C:
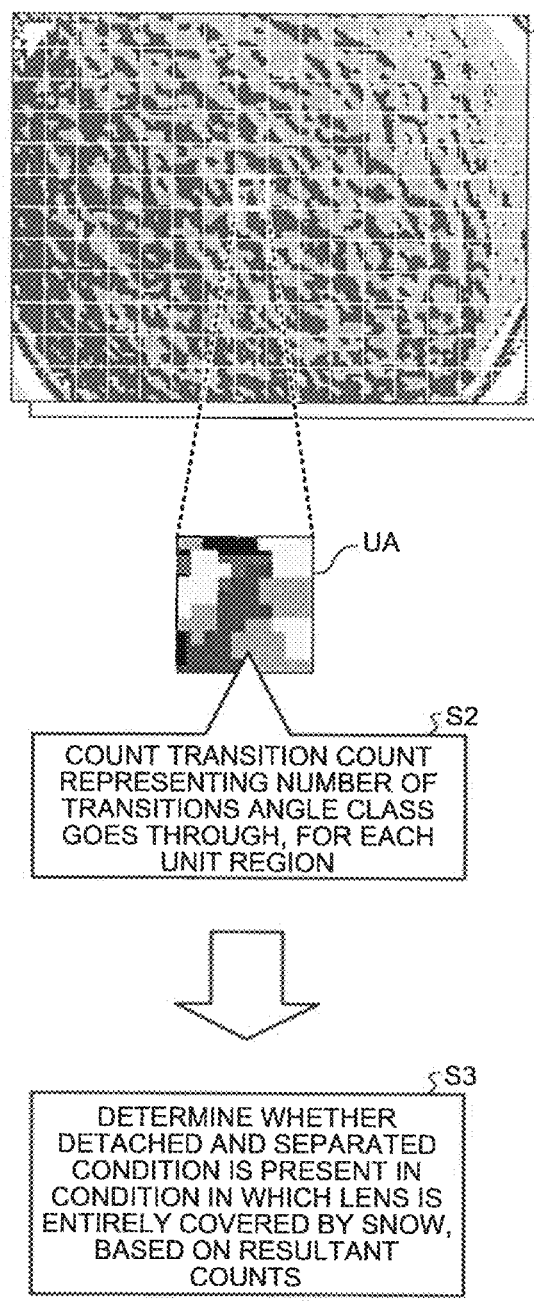
FIG. 1C is a third schematic for explaining the general outline of the adhering substance detection method according to the embodiment.

To begin with, a general outline of the adhering substance detection method according to the embodiment will be explained with reference to FIGS. 1A to 1C. FIGS. 1A to 1C are first to third schematics for explaining a general outline of the adhering substance detection method according to the embodiment.

As illustrated in FIG. 1A, it is assumed herein that there is a captured image I captured by a camera that is onboard a vehicle, in a condition in which the entire surface of the lens is covered by snow (hereinafter, sometimes referred to as a "condition in which the lens is entirely covered by snow"). Explained below is an example in which an adhering substance detection apparatus 1 (see FIG. 2) that is one application of the adhering substance detection method according to the embodiment detects the adhesion of the snow covering the entire lens surface, but becoming detached and separated from the lens surface, based on a feature value related to a luminance gradient (hereinafter, sometimes referred to as an "edge feature value") at each pixel of the captured image I.

As an adhering substance detection method according to a comparative example, there is a method for detecting the condition in which the lens is entirely covered by snow, using an angle feature value that is included in the edge feature value mentioned above. An angle feature value represents the orientation (hereinafter, sometimes referred to as an "edge orientation") of an edge vector (luminance gradient) at a pixel.

This adhering substance detection method according to the comparative example classifies, for example, the edge orientation at each pixel to a predetermined angle range that is an angle class, and detects the condition in which the lens is entirely covered by snow based on a combination of pixels having the edge orientations classified into angle classes not in directions opposing to each other.

For example, the adhering substance detection method according to the comparative example classifies the edge orientation at each pixel into one of an upward direction, a downward direction, a leftward direction, and a rightward direction each representing an angle range resultant of dividing 0 degrees to 360 degrees at an interval of 90 degrees, as illustrated in the lower part of FIG. 1A. Taking advantage of a characteristic that an edge is estimated to be a contour of an object in the captured image I when the edge orientations at adjacent pixels are classified into angle classes of directions opposing to each other by 180 degrees (e.g., into the "downward" direction with respect to the "upward" direction, or to the "rightward" direction with respect to the "leftward" direction), the adhering substance detection method detects the condition in which the lens is entirely covered by snow, by retrieving for a combination of pixels having edge orientations in a pattern other than those opposing to each other.

Illustrated in the left center of FIG. 1A is an angle-classified image that is a visualization of a result of applying the angle classification described above to the captured image I captured in the condition in which the lens is entirely covered by snow. The example illustrated on the left side in FIG. 1A is an example in which the adhering substance detection apparatus according to the comparative example has successfully detected the condition in which the lens is entirely covered by snow.

It is assumed now that the snow has started to become detached from the lens surface, e.g., by melting. In such a case, the adhering substance detection method according to the comparative example sometimes becomes incapable of detecting the condition in which the lens is entirely covered by snow, as illustrated in the center and on the right side in FIG. 1A.

As illustrated in FIG. 1A, observing the characteristics of the angle-classified images, as the snow becomes more detached from the lens, granularity in the appearance increases. In other words, aggregations of the angle classes become smaller in size, or it can also be said that there is less bias toward some angle classes.

Also as illustrated in FIG. 1A, looking at a unit region UA that is a predetermined region composed of a predetermined number of pixels, there is a tendency that the angle class goes through a transition more frequently, and the opposing angle classes appear more frequently. Because a contour of an object is estimated more strongly when the opposing angle classes appear more frequently, it is difficult for the adhering substance detection method according to the comparative example to detect the detached and separated condition while the lens is still entirely covered by snow.

To address this issue, the adhering substance detection method according to the embodiment performs two types of angle classifications to one captured image I, as illustrated in FIG. 1B (Step S1). Specifically, a first angle classification classifies an edge orientation to one of the upward direction, the downward direction, the leftward direction, and the rightward direction each representing an angle range of 90 degrees, as illustrated in FIG. 1A. Hereinafter, this first angle classification will be sometimes referred to as an "up/down/left/right four classification".

By contrast, a second angle classification rotates the angle ranges used in the "up/down/left/right four classification" by 45 degrees, and classifies an edge orientation to one of an upper-rightward direction, a lower-rightward direction, an upper-leftward direction, and a lower-leftward direction. Hereinafter, this second angle classification will be sometimes referred to as a "tiled four classification".

In this manner, because these two types of angle classifications are performed, even if the first angle classification classifies a pixel with an edge orientation of 120 degrees and another pixel with an edge orientation of −120 degrees into opposing angle ranges, for example, the second angle classification does not classify such pixels into opposing angle ranges. Therefore, it is possible to detect the change in the edge orientations, the change taking place as the snow becomes more detached from the lens surface, highly accurately.

The adhering substance detection method according to the embodiment then counts a transition count representing the number of transitions the angle class goes through, for each of the unit regions GA in each of the angle-classified images achieved by the first angle classification and the second angle classification, respectively, as illustrated in FIG. 1C (Step S2). It is then determined whether the detached and separated condition is present in the condition in which the lens is still entirely covered by the snow, based on the resultant counts (Step S3).

In other words, as described above, as the snow becomes more detached from the lens, the aggregations of the angle classes become smaller in size, and the angle class goes through a transition more frequently. Therefore, the adhering substance detection method according to the embodiment determines these characteristics based on the transition counts corresponding to the respective angle classes, counted in units of the unit regions UA. A method for counting the transition count, and a method for making such a determination based on the resultant counts will be described later in the explanation with reference to FIGS. 4A to 5B.

Figure 5B:
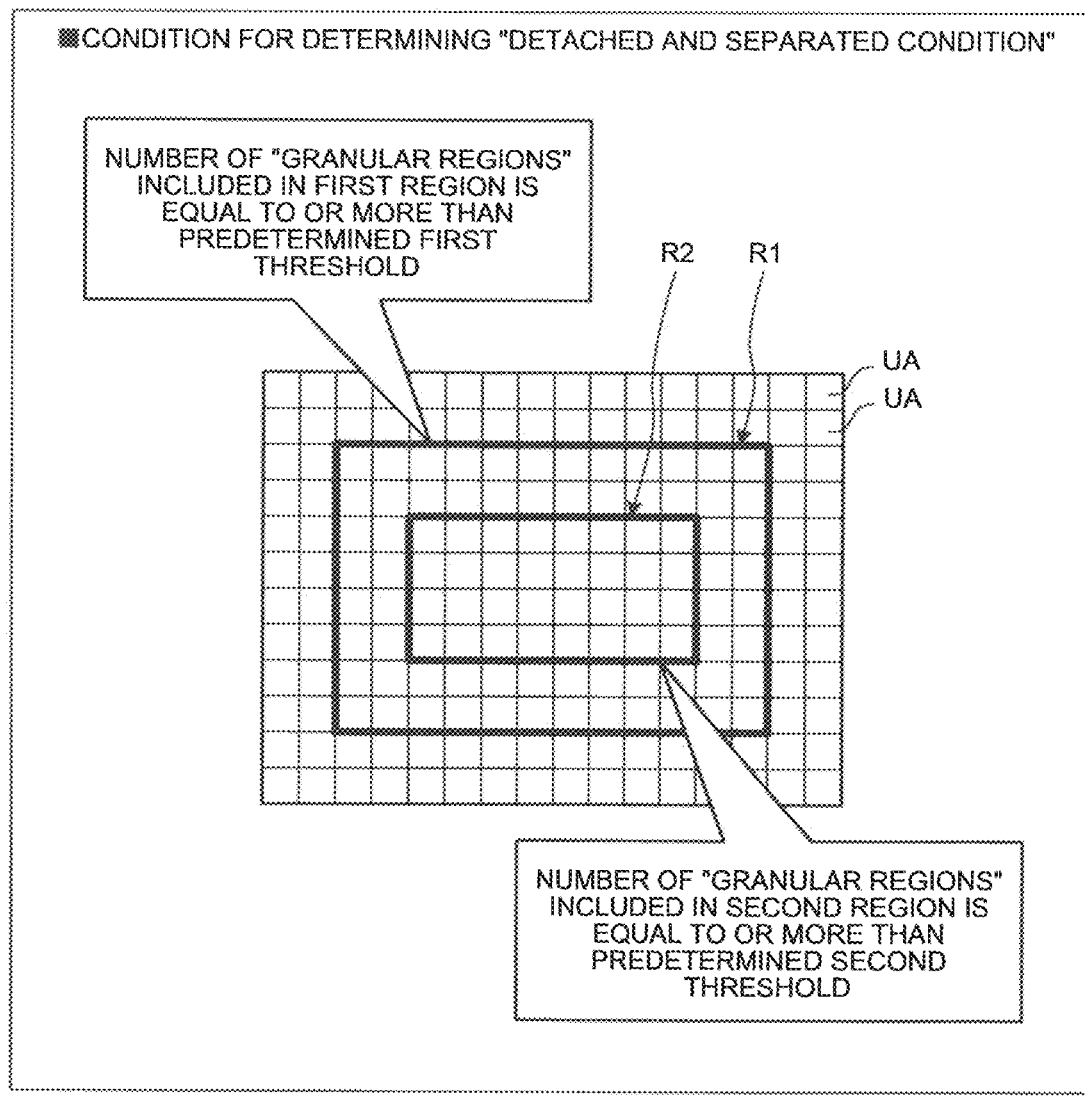
FIG. 5B is a second schematic illustrating the details of the determination process performed by the determining unit.

Furthermore, the adhering substance detection method according to the embodiment handles the edge feature values mentioned earlier in units of cells 100 each of which is composed of a predetermined number of pixels PX (see FIG. 5B, for example). This point will be described later, in the explanation with reference to FIG. 3B and the like. Handling of the edge feature values in units of the cells 100 can contribute to the reduction of the processing load of the image processing.

An exemplary configuration of the adhering substance detection apparatus 1 that is an application of the adhering substance detection method according to the embodiment described above will now be explained specifically.

Figure 2:
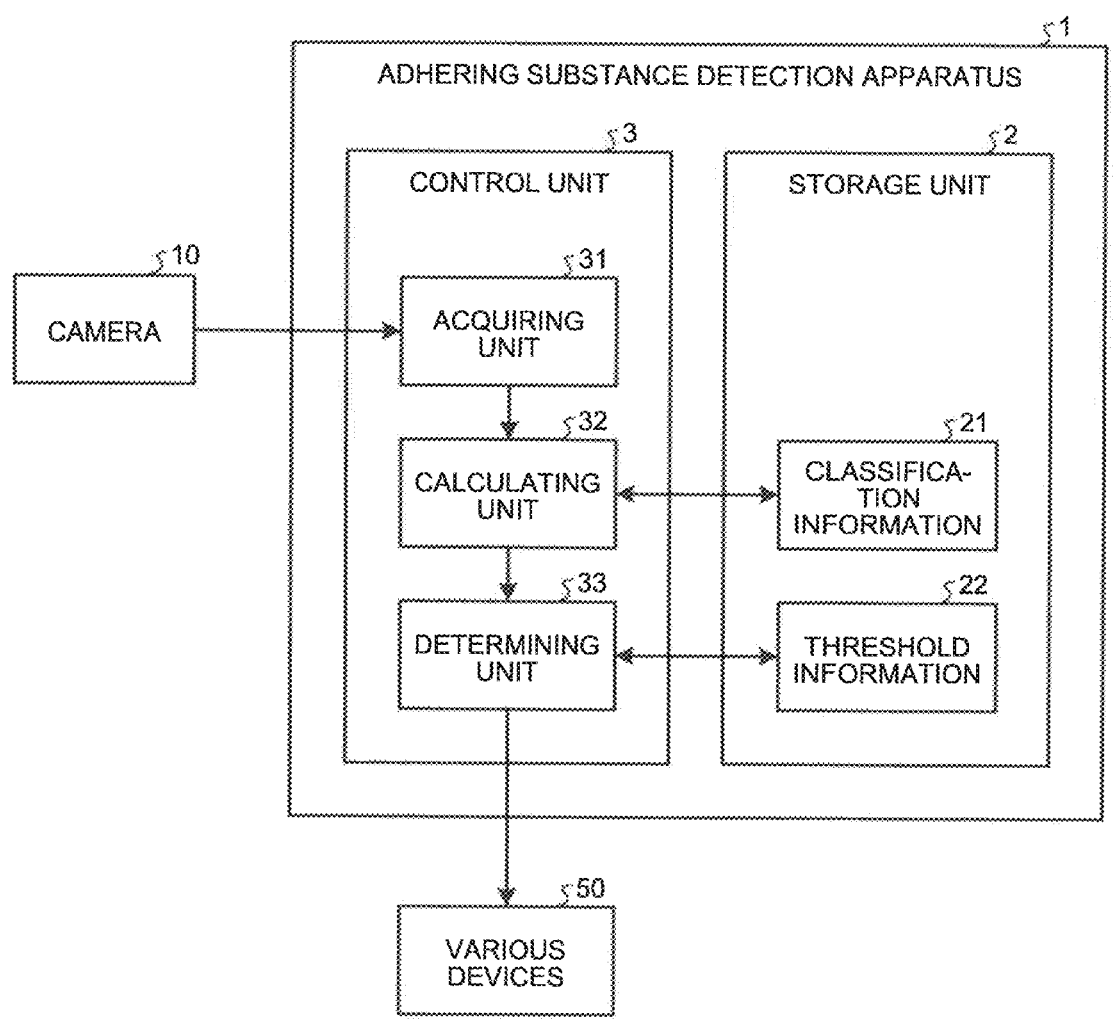
FIG. 2 is a block diagram of an adhering substance detection apparatus according to the embodiment.

FIG. 2 is a block diagram for explaining the adhering substance detection apparatus 1 according to the embodiment. In FIG. 2, only the elements required in the explanations of the characteristics of the embodiment are represented as functional blocks, and representations of general elements are omitted.

In other words, the elements illustrated in FIG. 2 are functional and conceptual representations, and do not necessarily need to be physically configured in the manner illustrated. For example, the specific configurations in which the functional blocks are distributed or integrated are not limited to those illustrated, and the whole or any part thereof may be configured to be functionally or physically distributed or integrated into any units, depending on various loads and utilization.

As illustrated in FIG. 2, the adhering substance detection apparatus 1 according to the embodiment includes a storage unit 2 and a control unit 3. The adhering substance detection apparatus 1 is connected to a camera 10 and various devices 50.

In the example illustrated in FIG. 2, the adhering substance detection apparatus 1 is provided separately from the camera 10 and the various devices 50, but the configuration is not limited thereto, and the adhering substance detection apparatus 1 may be integrated with at least one of the camera 10 and the various devices 50.

The camera 10 is a camera that is onboard a vehicle, and that is provided with a lens such as a fisheye lens, and an imaging device such as a charge-coupled device (CCD) or a complementary metal-oxide-semiconductor (CMOS), for example. The camera 10 is provided at each position where images of the front and the rear sides, and the lateral sides of the vehicle can be captured, for example, and outputs the captured images I to the adhering substance detection apparatus 1.

The various devices 50 are devices that perform various vehicle control by acquiring detection results of the adhering substance detection apparatus 1. The various devices 50 include a display device for notifying a user of the presence of an adhering substance adhering to the lens of the camera 10 or of an instruction for wiping the adhering substance, a removing device for removing the adhering substance by spraying fluid, gas, or the like toward the lens, and a vehicle control device for controlling automated driving and the like, for example.

The storage unit 2 is implemented as a random access memory (RAM), a semiconductor memory device such as a flash memory, or a storage device such a hard disk or an optical disc, for example, and stores therein classification information 21 and threshold information 22, in the example illustrated in FIG. 2.

The classification information 21 is information related to the angle classifications described above, and includes angle ranges or the like used in the first angle classification and the second angle classification, for example. The threshold information 22 is information related to thresholds that are used in a determination process performed by a determining unit 33, which will be described later.

The control unit 3 is a controller, and is implemented by causing a central processing unit (CPU) or a micro-processing unit (MPU) to execute various computer programs stored in an internal storage device of the adhering substance detection apparatus 1, using a RAM as a working area, for example. The control unit 3 may also be implemented as an integrated circuit such as an application-specific integrated circuit (ASIC) or a field-programmable gate array (FPGA).

The control unit 3 includes an acquiring unit 31, a calculating unit 32, and a determining unit 33, and implements or executes functions and actions of information processing to be described below.

The acquiring unit 31 acquires a captured image captured by the camera 10. The acquiring unit 31 performs a gray-scaling process for converting each pixel of the captured image I into a gray scale value between white and black based on the luminance, applies a smoothing process to the pixels, and outputs the result to the calculating unit 32. In the smoothing process, any smoothing filter such as a mean filter or a Gaussian filter may be used. Furthermore, the gray-scaling process or the smoothing process may be omitted.

The calculating unit 32 calculates an edge feature value, for each of the cells 100 included in the captured image I acquired by the acquiring unit 31. An edge feature value calculation process performed by the calculating unit 32 will now be explained specifically with reference to FIGS. 3A to 3C.

Figure 3C:
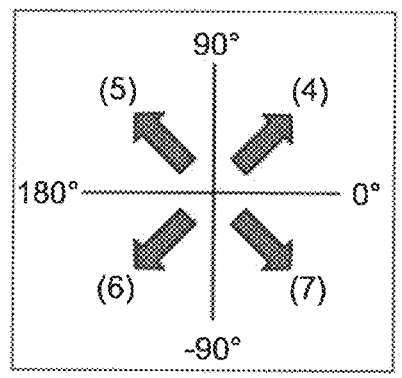
FIG. 3C is a third schematic illustrating the details of the calculation process performed by the calculating unit.

FIGS. 3A to 3C are first to third schematics illustrating the details of the calculation process performed by the calculating unit 32. As illustrated in FIG. 3A, to begin with, the calculating unit 32 applies an edge detection process to each pixel PX, and detects the strength of an edge ex in the X-axis direction (the horizontal direction of the captured image I) and the strength of an edge ey in the Y-axis direction (the vertical direction of the captured image I). In this edge detection process, any edge detection filter such as a Sobel filter or a Prewitt filter may be used.

The calculating unit 32 then calculates an edge vector V using a trigonometric function based on the detected strength of the edge ex in the X-axis direction and the detected strength of the edge ey in the Y-axis direction, and calculates an edge orientation that is an angle θ formed by the edge vector V and the X axis, and an edge strength that is the length L of the edge vector V.

The calculating unit 32 then calculates a representative value of the edge orientations in the cell 100, based on the edge vector V calculated for each of the pixels PX. Specifically, as illustrated in the upper part of FIG. 3B, for the edge vector V at each of the pixel PX included in the cell 100, the calculating unit 32 classifies, via the first angle classification, the edge orientation ranging between −180 degrees and 180 degrees into angle classes (0) to (3) representing the four directions of the upward, the downward, the leftward, and the rightward directions, with each class corresponding to an angle range of 90 degrees.

More specifically, if the edge orientation at a pixel PX is within an angle range equal to or more than −45 degrees and less than 45 degrees, the calculating unit 32 classifies the edge orientation to the angle class (0). If the edge orientation falls within the angle range equal to or more than 45 degrees and less than 135 degrees, the calculating unit 32 classifies the edge orientation to the angle class (1). If the edge orientation falls within the angle range equal to or more than 135 degrees and less than 180 degrees, or the angle range equal to or more than −180 degrees and less than −135 degrees, the calculating unit 32 classifies the edge orientation to the angle class (2). If the edge orientation falls within the angle range equal to or more than −135 degrees and less than −45 degrees, the calculating unit 32 classifies the edge orientation to the angle class (3).

As illustrated in the lower part of FIG. 3B, the calculating unit 32 then generates, for each of the cells 100, a histogram in which the angle classes (0) to (3) are plotted as the class. If the frequency of the class appearing at the highest frequency is equal to or higher than a predetermined threshold THa in the generated histogram, the calculating unit 32 then calculates the angle class corresponding to the class (the angle class (1) in the example illustrated in FIG. 3B as the first representative value of the edge orientations for the cell 100.

If the frequency of the class appearing at the highest frequency is less than the predetermined threshold THa, the calculating unit 32 handles the edge orientation in the cell 100 as being "invalid", that is, that "there is no representative edge orientation value". In this manner, it is possible to prevent a specific edge orientation from being calculated as a representative value when the edge orientations at the pixels PX are highly dispersed.

The calculating unit 32 performs the same process for the second angle classification, as illustrated in FIG. 3C. In other words, the calculating unit 32 classifies, for the edge vector V at each pixel PX of the cell 100, the edge orientation ranging between −180 degrees and 180 degrees into an angle class (4) to (7) representing the four diagonal directions, with each class corresponding to an angle range of 90 degrees, via the second angle classification.

More specifically, if the edge orientation at the pixel PX falls with the angle range equal to or more than 0 degrees and less than 90 degrees, the calculating unit 32 classifies the edge orientation to the angle class (4). If the edge orientation falls with the angle range equal to or more than 90 degrees and less than 180 degrees, the calculating unit 32 classifies the edge orientation to the angle class (5). If the edge orientation falls with the angle range equal to or more than −180 degrees and less than −90 degrees, the calculating unit 32 classifies the edge orientation to the angle class (6). If the edge orientation falls with the angle range equal to or more than −90 degrees and less than 0 degrees, the calculating unit 32 classifies the edge orientation to the angle class (7).

The calculating unit 32 then generates a histogram in which the angle classes (4) to (7) are plotted as the class, for each of the cells 100, in the same manner as illustrated in the lower part of FIG. 3B. In the generated histogram, if the frequency of the class appearing at the highest frequency is equal to or higher than predetermined threshold THa, the calculating unit 32 then calculates the angle class corresponding to the class as a second representative value of the edge orientations for the cell 100.

Returning to the explanation of FIG. 2, the calculating unit 32 generates two types of angle-classified images that are based on the calculated edge feature values, and counts a transition count representing the number of transitions the angle class goes through, for each of the unit regions UA included in the angle-classified images.

A calculation process performed by the calculating unit 32 will now be explained specifically with reference to FIGS. 4A and 4B. FIGS. 4A and 4B are fourth and fifth schematics illustrating the details of the calculation process performed by the calculating unit 32.

As illustrated in FIG. 4A, the calculating unit 32 calculates the transition count representing the number of transitions the angle class goes through across cells 100 that are arranged in the horizontal and the vertical directions within the unit region UA, for each of the unit regions UA included in the angle-classified image.

Specifically, as illustrated in FIG. 4A, it is assumed that there is an array of cells 100-1, 100-2, 100-3, and 100-4, and the angle classes representing the edge orientations in these cells are (0), (1), (1), and (2), respectively.

In such a case, as the calculating unit 32 scans from the cell 100-1 to the cell 100-2, the angle class goes through a transition from (0) to (1). Therefore, the calculating unit 32 adds +1 to the transition count corresponding to the angle classes (0), (1). As the calculating unit 32 scans from the cell 100-3 to the cell 100-4 included in the same array, the angle class goes through a transition from (1) to (2). Therefore, the calculating unit 32 adds +1 to the transition count corresponding to the angle classes (1), (2).

In the manner described above, the calculating unit 32 counts the transition counts representing the number of transitions the angle class goes through across the cells 100, for each of the unit regions UA, and calculates the transition counts corresponding to the respective angle classes of the "up/down/left/right four classification" and the "tiled four classification", as illustrated in FIG. 4B.

Returning to the explanation of FIG. 2, the calculating unit 32 outputs the transition counts corresponding to the respective angle classes, calculated for each of the unit region UA, to the determining unit 33. The determining unit 33 then determines, for each of the unit regions UA, whether the snow in the unit region UA is a "granular region" representing snow having become detached and separated from the lens, and having a granular appearance, based on the transition counts corresponding to the respective angle classes, calculated by the calculating unit 32.

The determining unit 33 also determines, based on the number of the unit regions UA determined to be the "granular regions, whether represented is a detached and separated condition of the snow, captured via a lens entirely covered by snow. The determining unit 33 also notifies the various devices 50 of the determination result.

The details of the determination process performed by the determining unit 33 will now be explained with reference to FIGS. 5A and 5B. FIGS. 5A and 5B are first and second schematics illustrating the details of the determination process performed by the determining unit 33.

As illustrated in FIG. 5A, the determining unit 33 determines that represented is a "granular region" if AND of conditions #1 to #3 is satisfied.

The condition #1 states that "(0) to (7) all appear, and their counts fall within a predetermined range". This condition #1 is targeted to determine that complicated angle transitions are locally observed, and that there is no bias toward a specific angle class. When the image resolution of the captured image I is 640×480, and that of the unit region UA is 40×40, the predetermined range specified in the condition. #1 is set as "1≤n<65", for example.

The condition #2 states that "the sum of (0) to (3) and the sum of (4) to (7) both fall within a predetermined range". This condition #2 is targeted to determine that granular appearance is different from that of a road or the like, and is within a predetermined range often observed in the detached and separated condition of snow. The predetermined range specified in the condition #2 is "90≤n<200", for example. To mention as a reference, a road surface with a snow accumulation exhibits a value of "75" or so, a snow wall exhibits a value of "210" or so, and an asphalt road surface exhibits a value of "250" or so.

The condition #3 states that "the region has a weak edge strength". In other words, the edge strength in the unit region UA is less than a predetermined value. This condition #3 is targeted to improve the reliability of the determination by taking the strength feature value, as well as the angle feature value, into consideration.

Furthermore, as illustrated in FIG. 5B, the determining unit 33 uses AND of the following conditions as a condition for the determination of the "detached and separated condition" of snow. The conditions state that: the number of "granular regions" included in a first region R1 illustrated in FIG. 5B is equal to or more than a predetermined first threshold; and the number of "granular regions" included in a second region R2 illustrated in FIG. 5B is equal to or more than a predetermined second threshold.

The first threshold is a looser condition than the second threshold. This is intended to take advantage of a characteristic that the pixels at positions nearer to the center are less affected by disturbance, so that the determination thereof can be made more easily. By making this determination in two stages in the first region R1 and the second region R2 using a stricter condition for the second region R2, it is possible to improve the accuracy of the detection of the condition in which the lens is entirely covered by snow.

The sequence of a process performed by the adhering substance detection apparatus 1 according to the embodiment will now be explained with reference to FIG. 6. FIG. 6 is a flowchart illustrating the sequence of the process performed by the adhering substance detection apparatus 1 according to the embodiment. Illustrated in FIG. 6 is the sequence of a process for a camera image corresponding to one frame.

As illustrated in FIG. 6, to begin with, the acquiring unit 31 acquires a captured image I (Step S101). The acquiring unit 31 also applies a gray-scaling process and a smoothing process to the captured image I.

The calculating unit 32 then calculates an edge feature value, for each of the predetermined cells 100 in the captured image I (Step S102). The calculating unit 32 then executes the two types of angle classifications, based on the edge orientations that are included in the calculated edge feature values (Step S103).

The calculating unit 32 counts a transition count representing the number of transitions the angle class goes through, for each of the unit regions UA, based on the result of the angle classifications (Step S104). The determining unit 33 then determines the presence of the detached and separated condition, in the condition in which the lens is entirely covered by snow, based on the resultant counts (Step S105).

The determining unit 33 then notifies the various devices 50 of the determination result (Step S106), and the process is ended.

As described above, the adhering substance detection apparatus 1 according to the embodiment includes the calculating unit 32 and the determining unit 33. The calculating unit 32 calculates, for each of the cells 100 each of which is composed of a predetermined number of the pixels PX in the captured image I, an edge feature value that is based on edge vectors V in the pixels PX, and classifies an edge orientation that is included in the edge feature value, into two types of angle classes. The determining unit 33 determines a condition of an adhering substance adhering to the camera 10 (corresponding to one example of an "image capturing device") that captured the captured image I, based on the transition counts representing the number of transitions the angle class goes through within a unit region UA that is a predetermined region composed of a predetermined number of the cells 100.

Therefore, with the adhering substance detection apparatus 1 according to the embodiment, the detection accuracy of the adhering substance can be improved.

Furthermore, the calculating unit 32 classifies the edge orientation via a first angle classification in which 360 degrees are divided into predetermined angle ranges, and a second angle classification in which 360 degrees are divided by rotating the angle ranges used in the first angle classification by a predetermined angle.

Therefore, with the adhering substance detection apparatus 1 according to the embodiment, even if one of the angle classifications classifies some edge orientations as opposing directions, it is possible to prevent such edge orientations from being classified as opposing directions by the other.

Furthermore, the determining unit 33 also determines that the unit region UA is a granular region (corresponding to an example of "a candidate region for the adhering substance in a predetermined adhering condition") when classification values used in the first angle classification and the classification values used in the second angle classification all appear in the unit region UA, and when their transition counts fall within a predetermined range.

Therefore, with the adhering substance detection apparatus 1 according to the embodiment, in the determination of a region having a granular appearance, it is possible to ensure that complicated angle transitions are locally observed, and there is no bias toward a specific angle class.

The determining unit 33 also determines that the unit region UA is a granular region when the sum of the transition counts corresponding to the classification values used in the first angle classification, and the sum of the transition counts corresponding to the classification values used in the second angle classification both fall within a predetermined range.

Therefore, with the adhering substance detection apparatus 1 according to the embodiment, in the determination of a region having a granular appearance, it is possible to confirm that the granular appearance is different from that of a road surface, and that these sums fall within a range often observed in the adhering substance in a detached condition.

The determining unit 33 also determines that the unit region UA is a granular region when the sum of the edge strengths included in the respective edge feature values is smaller than a predetermined value.

Therefore, with the adhering substance detection apparatus 1 according to the embodiment, in the determination of a region having a granular appearance, the reliability of the determination can be improved, by taking the edge strength, as well as the edge orientation, into consideration.

Furthermore, the determining unit 33 determines that the granular region is in a predetermined adhering condition when the number of granular regions included in a predetermined region composed of a predetermined number of unit regions UA in the captured image I is equal to or more than a predetermined threshold.

Therefore, with the adhering substance detection apparatus 1 according to the embodiment, by making a determination by integrating the determination results for the unit regions UA, the detection accuracy can be improved.

Furthermore, the determining unit 33 determines, when the adhering substance is snow, a condition in which the entire lens surface of the camera 10 is covered by the snow that is detached and separated from the lens surface, as the predetermined adhering condition.

Therefore, with the adhering substance detection apparatus 1 according to the embodiment, it is possible to detect the detached and separated condition of the snow with the lens entirely covered by snow, highly accurately.

Explained in the embodiment described above is an example in which the edge orientations are classified into four directions obtained by dividing 0 degrees to 360 degrees by an angle range of 90 degrees, but the angle range is not limited to 90 degrees. The edge orientations may be classified into six directions obtained by dividing 0 degrees to 360 degrees by an angle range of 60 degrees, for example.

Furthermore, the width of the angle range used in the first angle classification and the second angle classification may be different. For example, the first angle classification may be configured to classify angles at an interval of 90 degrees, and the second angle classification may be configured to classify angles at an interval of 60 degrees. Furthermore, the boundaries between the angle ranges are shifted by 45 degrees between those in the first angle classification and those in the second angle classification, but the angle by which the boundaries are shifted may be more than 45 degrees or less than 45 degrees. Furthermore, the predetermined number of pixels PX making up one cell 100 may be any number equal to or more than one.

Furthermore, explained in the embodiment above is an example in which the captured image I that is captured with a camera provided on board a vehicle is used, but the captured image I may be an image captured by a surveillance camera or a camera installed on a street light, for example. In other words, the captured image I may be any captured image I that is captured with a camera on which some adhering substances can adhere to the lens of the camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. An adhering substance detection apparatus comprising:
a controller comprising a processor or circuit and configured to function as:
a calculating unit that, for each cell of a plurality of cells of a captured image, each of the cells being composed of a predetermined number of pixels in the captured image, (i) calculates an edge feature value that is based on edge vectors calculated for the pixels and (ii) classifies an edge orientation, which is included in the calculated edge feature value, to an angle class via two types of angle classifications; and
a determining unit that determines a condition of an adhering substance adhering to an image capturing apparatus that captured the captured image, based on a transition count representing a number of transitions of the angle class within a unit region, which is a predetermined region composed of a predetermined number of the cells.

2. The adhering substance detection apparatus according to claim 1, wherein the calculating unit classifies the edge orientation via (i) a first angle classification of the two types of angle classifications, in which 360 degrees are divided into predetermined angle ranges, and (ii) a second angle classification of the two types of angle classifications, in which 360 degrees are divided by rotating the angle ranges used in the first angle classification by a predetermined angle.

3. The adhering substance detection apparatus according to claim 2, wherein the determining unit determines that the unit region is a candidate region for the adhering substance being in a predetermined adhering condition (i) when classification values used in the first angle classification and classification values used in the second angle classification all appear in the unit region and (ii) when transition counts thereof fall within a predetermined range.

4. The adhering substance detection apparatus according to claim 2, wherein the determining unit determines that the unit region is a candidate region for the adhering substance being in a predetermined adhering condition when (i) a sum of transition counts corresponding to classification values used in the first angle classification and (ii) a sum of transition counts corresponding to classification values used in the second angle classification both fall within a predetermined range, the transition counts being those in the unit region.

5. The adhering substance detection apparatus according to claim 3, wherein the determining unit determines that the unit region is the candidate region for the adhering substance being in the predetermined adhering condition when a sum of the transition counts corresponding to the classification values used in the first angle classification and (ii) a sum of the transition counts corresponding to the classification values used in the second angle classification both fall within a predetermined range, the transition counts being those in the unit region.

6. The adhering substance detection apparatus according to claim 1, wherein the determining unit determines that the unit region is a candidate region for the adhering substance being in a predetermined adhering condition when a sum of edge strengths included in the respective edge feature values is smaller than a predetermined value, the sum being that in the unit region.

7. The adhering substance detection apparatus according to claim 2, wherein the determining unit determines that the unit region is a candidate region for the adhering substance being in a predetermined adhering condition when a sum of edge strengths included in the respective edge feature values is smaller than a predetermined value, the sum being that in the unit region.

8. The adhering substance detection apparatus according to claim 3, wherein the determining unit determines that the unit region is the candidate region for the adhering substance being in the predetermined adhering condition when a sum of edge strengths included in the respective edge feature values is smaller than a predetermined value, the sum being that in the unit region.

9. The adhering substance detection apparatus according to claim 4, wherein the determining unit determines that the unit region is the candidate region for the adhering substance being in the predetermined adhering condition when a sum of edge strengths included in the respective edge feature values is smaller than a predetermined value, the sum being that in the unit region.

10. The adhering substance detection apparatus according to claim 5, wherein the determining unit determines that the unit region is the candidate region for the adhering substance being in the predetermined adhering condition when a sum of edge strengths included in the respective edge feature values is smaller than a predetermined value, the sum being that in the unit region.

11. The adhering substance detection apparatus according to claim 3, wherein the determining unit determines that the candidate region is in the predetermined adhering condition when a number of candidate regions included in a predetermined region composed of a predetermined number of unit regions in the captured image is equal to or more than a predetermined threshold.

12. The adhering substance detection apparatus according to claim 4, wherein the determining unit determines that the candidate region is in the predetermined adhering condition when a number of candidate regions included in a predetermined region composed of a predetermined number of unit regions in the captured image is equal to or more than a predetermined threshold.

13. The adhering substance detection apparatus according to claim 5, wherein the determining unit determines that the candidate region is in the predetermined adhering condition when a number of candidate regions included in a predetermined region composed of a predetermined number of unit regions in the captured image is equal to or more than a predetermined threshold.

14. The adhering substance detection apparatus according to claim 6, wherein the determining unit determines that the candidate region is in the predetermined adhering condition when a number of candidate regions included in a predetermined region composed of a predetermined number of unit regions in the captured image is equal to or more than a predetermined threshold.

15. The adhering substance detection apparatus according to claim 7, wherein the determining unit determines that the candidate region is in the predetermined adhering condition when a number of candidate regions included in a predetermined region composed of a predetermined number of unit regions in the captured image is equal to or more than a predetermined threshold.

16. The adhering substance detection apparatus according to claim 8, wherein the determining unit determines that the candidate region is in the predetermined adhering condition when a number of candidate regions included in a predetermined region composed of a predetermined number of unit regions in the captured image is equal to or more than a predetermined threshold.

17. The adhering substance detection apparatus according to claim 9, wherein the determining unit determines that the candidate region is in the predetermined adhering condition when a number of candidate regions included in a predetermined region composed of a predetermined number of unit regions in the captured image is equal to or more than a predetermined threshold.

18. The adhering substance detection apparatus according to claim 10, wherein the determining unit determines that the candidate region is in the predetermined adhering condition when a number of candidate regions included in a predetermined region composed of a predetermined number of unit regions in the captured image is equal to or more than a predetermined threshold.

19. The adhering substance detection apparatus according to claim 3, wherein when the adhering substance is snow, the determining unit determines as the predetermined adhering condition, a condition in which an entire lens surface of the image capturing apparatus is covered by the snow that is detached and separated from the lens surface.

20. An adhering substance detection method comprising:
  for each cell of a plurality of cells of a captured image, each of the cells being composed of a predetermined number of pixels in the captured image, (i) calculating an edge feature value that is based on edge vectors calculated for the pixels and (ii) classifying an edge orientation, which is included in the calculated edge feature value, to an angle class using two types of angle classifications; and
  determining a condition of an adhering substance adhering to an image capturing apparatus that captured the captured image, based on a transition count representing a number of transitions of the angle class within a unit region, which is a predetermined region composed of a predetermined number of the cells.

* * * * *